(12) United States Patent
Agresta

(10) Patent No.: US 7,241,379 B2
(45) Date of Patent: Jul. 10, 2007

(54) FILTER HOUSING ARRANGEMENT

(75) Inventor: Mark G. Agresta, Blacksburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 194 days.

(21) Appl. No.: 10/984,353

(22) Filed: Nov. 8, 2004

(65) Prior Publication Data

US 2006/0096902 A1 May 11, 2006

(51) Int. Cl.
*A01K 63/04* (2006.01)

(52) U.S. Cl. .............. 210/167.27; 210/232; 210/416.2; 119/259

(58) Field of Classification Search ................ 210/169, 210/232, 236, 416.1, 416.2, 167.21, 167.27; 119/259–261
See application file for complete search history.

(56) References Cited

U.S. PATENT DOCUMENTS

| | | | | |
|---|---|---|---|---|
| 3,362,888 A | * | 1/1968 | Ricigliano | ................ 202/190 |
| 3,638,795 A | * | 2/1972 | Feddern et al. | ............ 210/149 |
| 3,721,212 A | * | 3/1973 | Groth | ......................... 119/266 |
| 3,854,450 A | * | 12/1974 | Puckett | ....................... 119/248 |
| 4,211,157 A | * | 7/1980 | Sakai et al. | .................... 99/306 |
| 4,783,258 A | | 11/1988 | Willinger et al. | |
| 4,997,559 A | | 3/1991 | Ellis et al. | |
| 5,002,660 A | | 3/1991 | Sherman et al. | |
| 5,026,477 A | * | 6/1991 | Yen | ............................ 210/169 |
| 5,228,986 A | | 7/1993 | Ellis et al. | |
| 5,419,831 A | | 5/1995 | Fuerst et al. | |
| 5,480,590 A | * | 1/1996 | Neshat et al. | ................. 261/30 |
| 5,853,591 A | | 12/1998 | Snyder et al. | |

FOREIGN PATENT DOCUMENTS

JP 7-59485 * 3/1995

OTHER PUBLICATIONS

"Fishease keeping fish with ease™," *Jonas Works, Inc.*, http://www.jonasworks.com/ (Date: Publicly known prior to the filing date of the present application).
Exhibit A, Penguin 150 Bio-Wheel Power Filter, 5 sheets (Date: Unknown, however, publicly disclosed as early as Dec. 2004).
Exhibit B, Penguin® Power Filter Models: 100, 150, 200 and 350, 2 sheets (Date: Unknown, however, publicly disclosed as early as Dec. 2004).

* cited by examiner

*Primary Examiner*—Fred G. Prince
(74) *Attorney, Agent, or Firm*—Merchant & Gould P.C.

(57) ABSTRACT

An aquarium filter arrangement including a filter housing and a filter cartridge positionable within a filter chamber of the filter housing. The filter arrangement includes a hinged cover connected to the filter housing. The hinged cover is designed to collect condensation when the cover is in an open position, and empty the collected condensation into the filter chamber when the cover is closed. The filtering housing also includes guides located above the filter chamber. The filter cartridge can be positioned within the guides during maintenance of the aquarium.

10 Claims, 7 Drawing Sheets

FILTER HOUSING ARRANGEMENT

CROSS-REFERENCE TO RELATED APPLICATIONS

This application is related to application Ser. No. 10/984,193, entitled FILTER HOUSING ARRANGEMENT WITH CARTRIDGE GUIDES; which application is filed concurrently herewith and incorporated herein by reference.

TECHNICAL FIELD

This disclosure relates generally to methods and devices for filtering aquarium water. More particularly, this disclosure relates to a filter housing arrangement and methods related to use of the filter housing arrangement.

BACKGROUND

To maintain an ecological balance within an aquarium, it is necessary to keep the water in the aquarium clean. Cleaning is often accomplished by pumping water from the aquarium to a filter device, filtering the water through a filter medium, and returning the filtered water to the aquarium.

As aquarium water passes through the filter media, various particulates trapped by the media can gradually slow or block the passage of water through the media. Thus, it is necessary for the user to periodically remove and replace the filter media. As can be understood, the filter media is typically submerged within the filter housing during operation, and is therefore saturated with water when initially removed from the filter housing. A user is therefore required to either hold the filter media over the aquarium until the water drains from the media, or attempt to dispose of the filter media without dripping water on electrical components or other items or articles that can either be damaged or stained from the water.

Also, aquarium water is often heated to maintain a particular temperature range within the aquarium for the fish. Covers positioned on top of filter housings are frequently subject to condensation caused by the temperature differential between the heated aquarium water contained within the filter housing and the ambient room temperature. In conventional arrangements, when the cover is lifted and removed, a user must again take care to not drip the condensation onto electrical components or other items.

In general, improvement has been sought with respect to such arrangements, generally to accommodate ease of use and improved safety and convenience.

SUMMARY

One aspect of the present disclosure relates to a filter arrangement for use with an aquarium. The filter arrangement includes a filter housing having a filter chamber and a filter cartridge positionable within the filter housing. The filter arrangement also includes a hinged cover connected to the filter housing. The hinged cover includes a water retaining structure configured to retain condensation within the cover when the cover is selectively opened.

Another aspect of the present disclosure relates to a method of accessing a filter cartridge positioned in an aquarium filter. The method includes pivoting a hinged cover of the aquarium filter from a closed position to an open position; accessing the filter cartridge positioned in a filter chamber of the aquarium filter; and pivoting the hinged cover from the open position to the closed position while emptying condensation collected in the opened cover into the filter chamber.

Still another aspect of the present disclosure relates to a filter arrangement including a filter housing defining a filter chamber. The filter housing includes filter chamber guides located in the filter chamber. The filter chamber guides are constructed to receive a filter cartridge. The filter housing also includes secondary guides located above the filter chamber. The secondary guides are constructed to receive a filter cartridge so that water contained within the filter cartridge drains either into the filter chamber of the housing or into the aquarium.

Yet another aspect of the present disclosure relates to a method of replacing a filter cartridge in an aquarium filter. The method includes removing a first filter cartridge from a filter chamber defined by the aquarium filter, and inserting the first filter cartridge into cartridge retaining structure arranged such that water contained within the first filter cartridge drains into either the filter chamber or the aquarium. The method also includes placing a second filter cartridge within the filter chamber, and removing the first filter cartridge from the retaining structure.

And, another aspect of the present disclosure relates to a method of applying a treatment to an aquarium environment. The method includes removing a filter cartridge from a filter chamber of a filter housing; inserting the filter cartridge into retaining structure formed on the filter housing so that the filter cartridge is isolated from a flow of water generated by operation of the filter; and applying a treatment to the aquarium environment.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
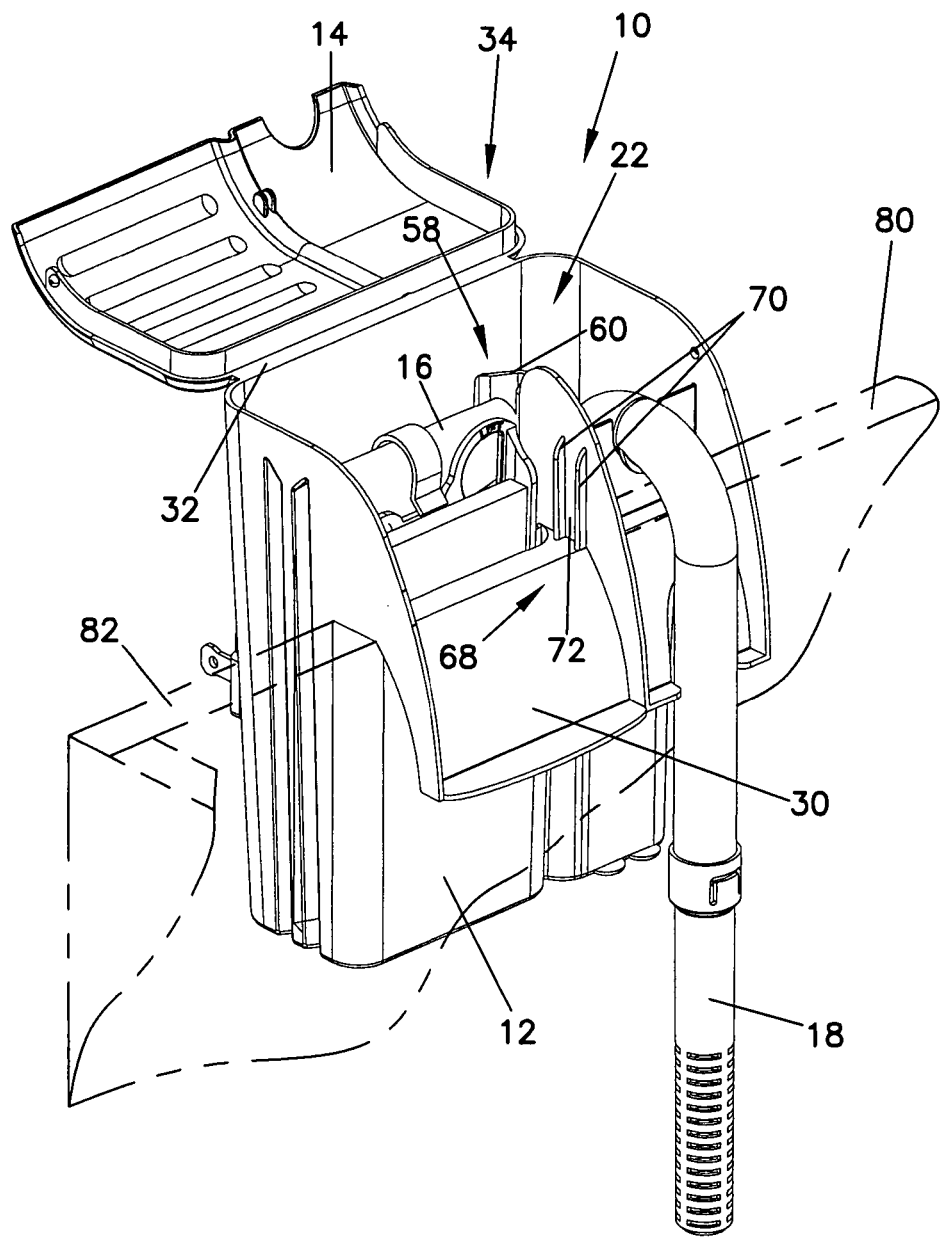
FIG. 1 is a front perspective view of a filter arrangement in accord with the principles of the present disclosure.

FIG. 1 illustrates a filter arrangement 10 having features that are examples of how inventive aspects in accordance with the principles of the present disclosure may be practiced. Preferred features are adapted for providing ease of use of the filter arrangement and reducing the likelihood of damaging water-sensitive components or articles.

As shown in FIG. 1, the filter arrangement 10 generally includes a filter housing or box 12, a cover 14, and a filter cartridge 16 positionable within the filter housing 12. The filter arrangement 10 typically mounts externally to, or at the outside of, an aquarium 80 (partially, schematically illustrated in FIGS. 1 and 6). A pump assembly 20 (FIG. 2) draws water from the aquarium 80 through an intake tube 18 that extends into the aquarium. The water is then directed into a filter chamber 22 of the housing 12 for filtration.

Figure 3:
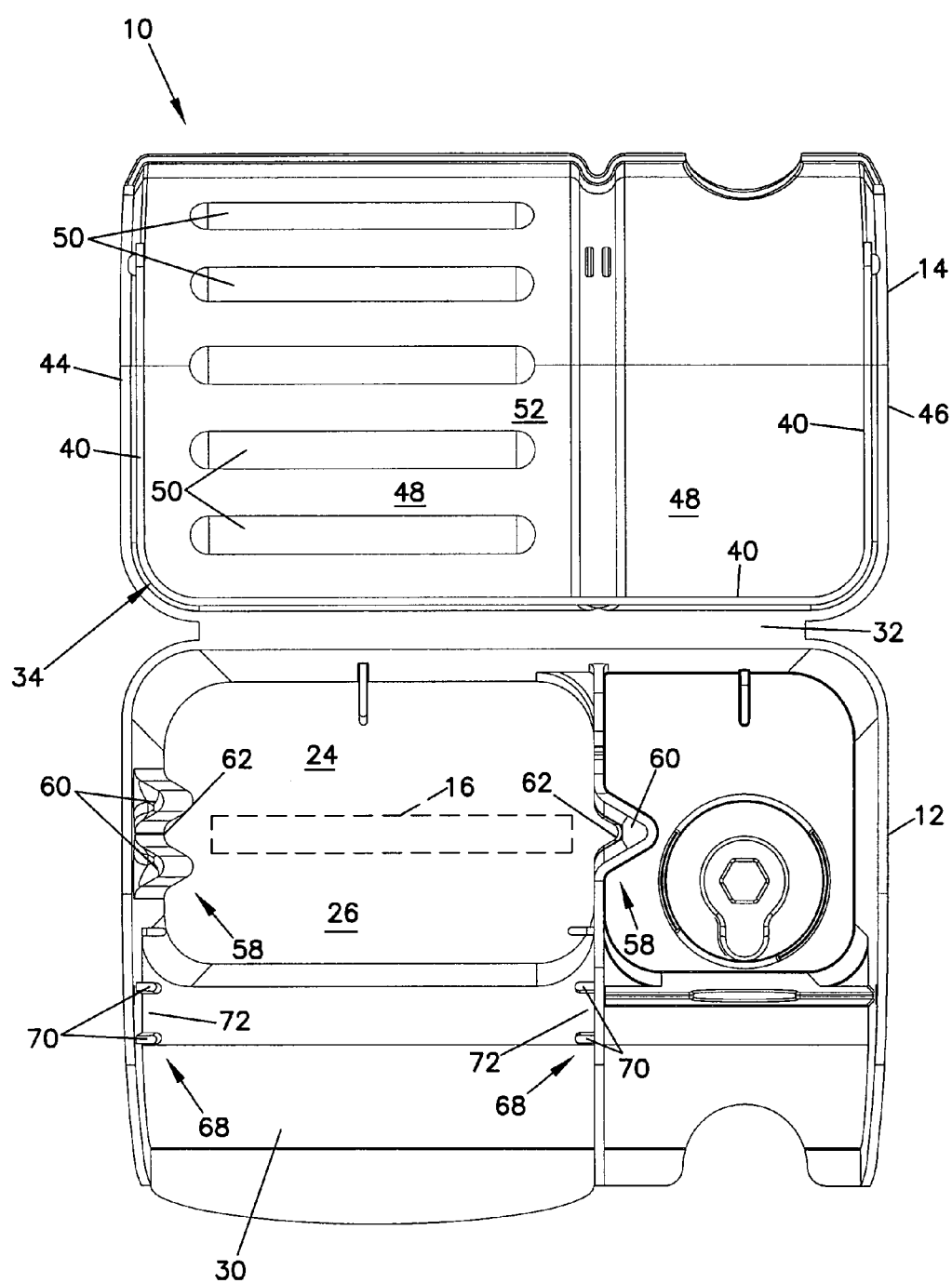
FIG. 3 is a top plan view of the filter arrangement of FIG. 1, schematically representing a filter cartridge shown in FIG. 1.

The filter cartridge 16 divides the filter chamber 22 of the housing 12 into an intake chamber 24 and a discharge chamber 26 (FIG. 3). Waterflow from the intake tube 18 is directed into the intake chamber 24. The water then passes through the filter cartridge 16 and into the discharge chamber 26. Once the water level in the discharge chamber 26 reaches a sufficient height, the filtered water spills over a spillway 30. The spillway 30 of the filter arrangement 10 is constructed to mount over an edge 82 of the aquarium 80 so that the filtered water is directed back into the aquarium.

As previously discussed, aquarium water is often heated to maintain a particular temperature range within the aquarium. Conventional covers, which are positioned on top of filter housings, often experience condensation caused by the temperature differential between the heated aquarium water contained within the filter housing and the ambient room temperature. When the conventional covers are removed from the housing, condensation drops can fall onto electrical components or other items or articles causing water damage or stains.

Figure 4:
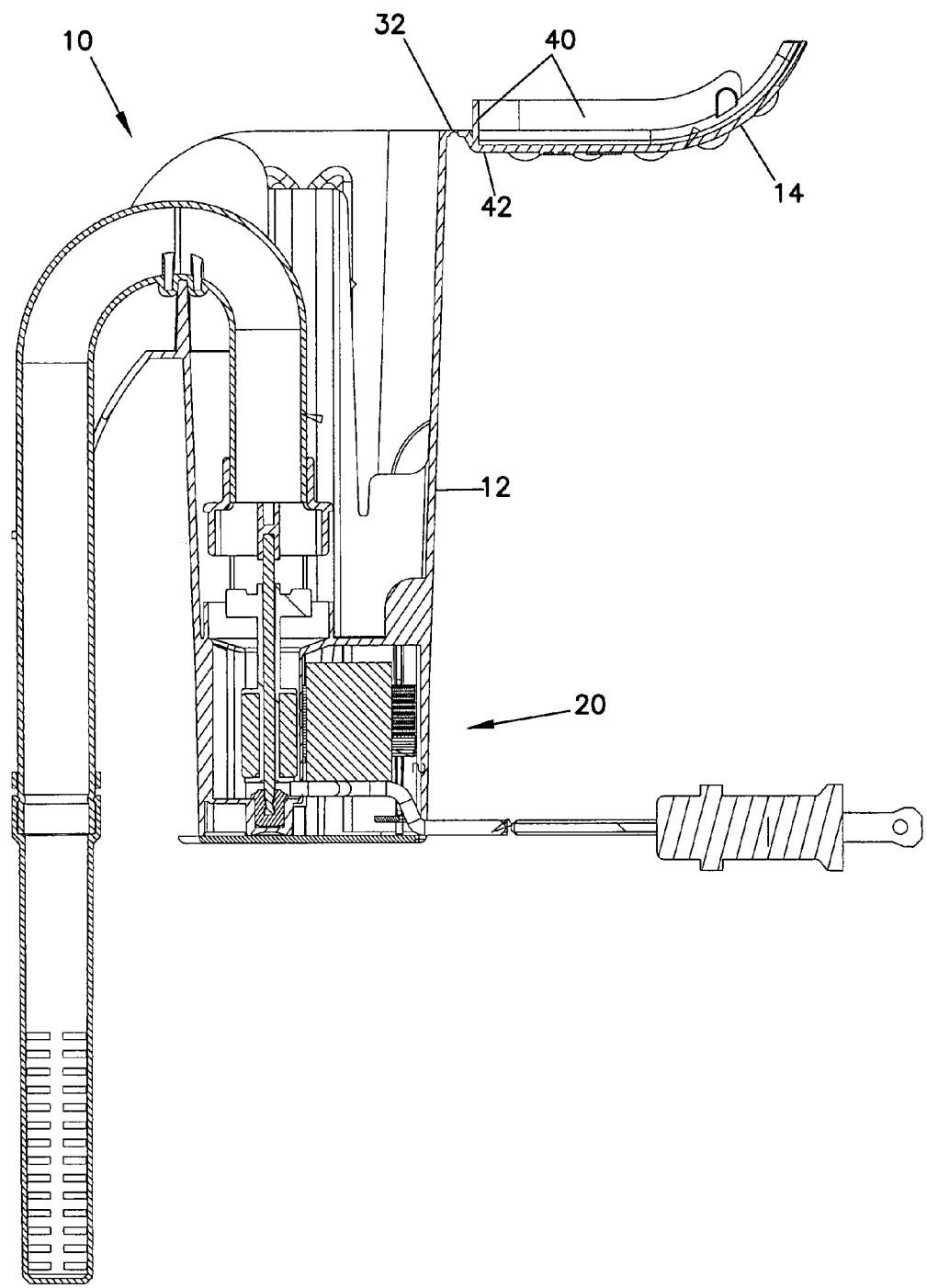
FIG. 4 is a cross-sectional view of the filter arrangement of FIG. 1, shown with a cover open.
Figure 5:
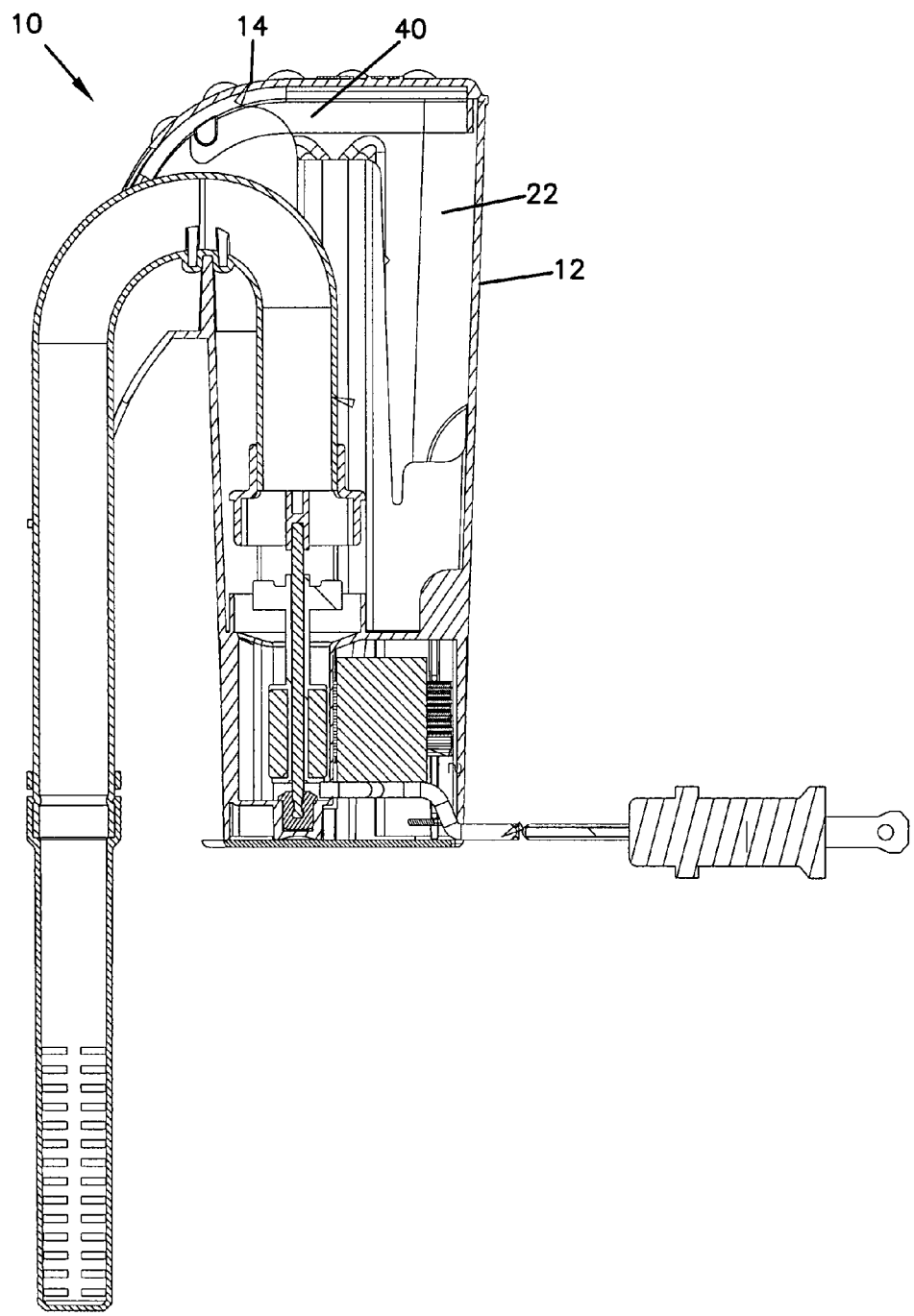
FIG. 5 is a cross-sectional view of the filter arrangement of FIG. 4, shown with the cover closed.

The cover 14 of the disclosed filter arrangement 10 is preferably hinged to the filter housing 12 so that the cover can pivot between an opened positioned (shown in FIG. 4) and a closed position (shown in FIG. 5). In the illustrated embodiment, the cover 14 includes a hinging seam or connection 32. Other types of hinging or pivoting mechanisms, such as, for example, a separate or integral pin joint or a flexible strap can also be used.

The hinging connection 32 secures the cover 14 to the filter housing 12 so that a user may simply pivot the cover to access the interior of the housing 12 without having to remove the cover. The user therefore doesn't have to worry about dripping condensation on electrical components or other items, as happens when a user removes and lifts covers of conventional arrangements. In addition, the hinged design is convenient in that a user has two free hands to do whatever maintenance is necessary, without having to transport or set the cover to the side.

The cover 14 of the present disclosure also preferably includes a water retaining structure 34. The water retaining structure 34 addresses the problem of containing any condensation that may have accumulated on the cover, when the cover is opened. More preferably, the water retaining structure 34 is configured to hold or collect condensation when the cover is opened, and empty the condensation into the filter chamber 22 of the filter housing 12 when the cover 14 is subsequently closed.

Figure 2:
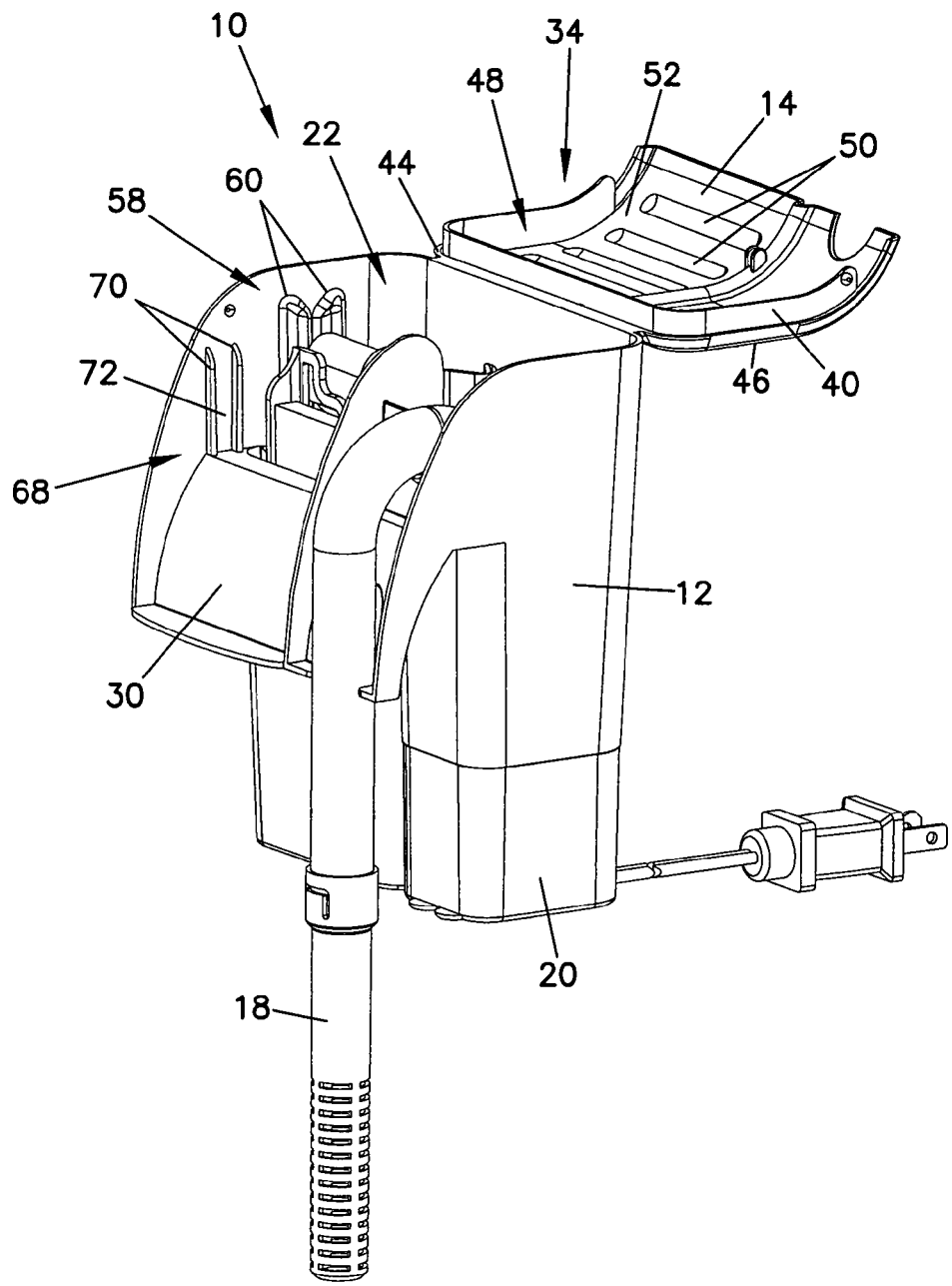
FIG. 2 is a side perspective view of the filter arrangement of FIG. 1.

Referring now to FIGS. 2 and 3, the water retaining structure 34 includes a lip 40. The lip 40 extends along a first end 42 of the cover 14 and along opposite sides 44, 46 of the cover 14. In the illustrated embodiment, the lip 40 extends along a majority of a perimeter of the cover 14.

When the cover 14 is opened, condensation formed on the cover accumulates within a collection region 48 of the cover 14. The collection region 48 is defined by a concave underside 52 of the cover 14 shaped to hold condensation while a user accesses the interior of the filter housing 12 or performs other maintenance. In the illustrated embodiment, recesses 50 are formed in the underside 52 of the cover 14. The recesses 50 are also provided for the collection of condensation. The embodiment shown has five recesses 50 formed in the underside 52 of the cover 14, although any number of recesses 50 can be provided.

Referring now to FIG. 5, the lip 40 of the cover 14 is configured to fit within the interior of the filter housing 12 so that as the cover 14 is subsequently closed, the accumulated condensation empties into the filter chamber 22 of the filter housing 12.

The filter arrangement 10 of the present disclosure also includes a no-mess draining feature. Referring to FIGS. 1–3, the filter housing 12 includes first and second cartridge retaining structures 58, 68. The first cartridge retaining structure 58 includes filter chamber guides 60 located in the filter chamber 22. The filter chamber guides 60 define vertical slots 62 that receive the filter cartridge 16. The filter chamber guides 60 secure the filter cartridge 16 within the filter chamber 22 of the filter housing 12 during filtration.

The second cartridge retaining structure 68 includes secondary guides 70. The secondary guides 70 also define vertical slots 72 that receive the filter cartridge 16. The secondary guides 70 secure the filter cartridge 16 at a location above the filter chamber 22 of the filter housing 12. In the illustrated embodiment, the secondary guides 70 are located adjacent to the spillway 30. It is to be understood that the second cartridge retaining structure 68 can include other structure configured to hold or contain the filter cartridge 16. In addition, the second cartridge retaining structure 68 can be disposed in a number of locations that accomplish the no-mess draining feature described in greater detail hereinafter.

During maintenance of the aquarium, such as while replacing a clogged or used filter cartridge, the used filter cartridge is removed from the filter chamber 22 by lifting the filter cartridge 16 out of the filter chamber slots 62. As can be understood, the filter cartridge 16 is typically saturated with water. In conventional arrangements, a user either holds the filter cartridge over the aquarium until the water from the used cartridge drains, or the user attempts to quickly dispose of the filter while trying to avoid dripping the water.

The present filter arrangement 10 permits a user to drain the used cartridge, hands-free, so that the user can do other things while the used cartridge 16 is draining. In particular, after the used filter cartridge is removed, the used filter cartridge is then inserted within the spillway slots 72 of the secondary guides 70. When inserted into the spillway slots 72, the filter cartridge 16 is retained in a generally vertical orientation outside of, and above the filter chamber 22 of the filter housing 12.

Figure 6:
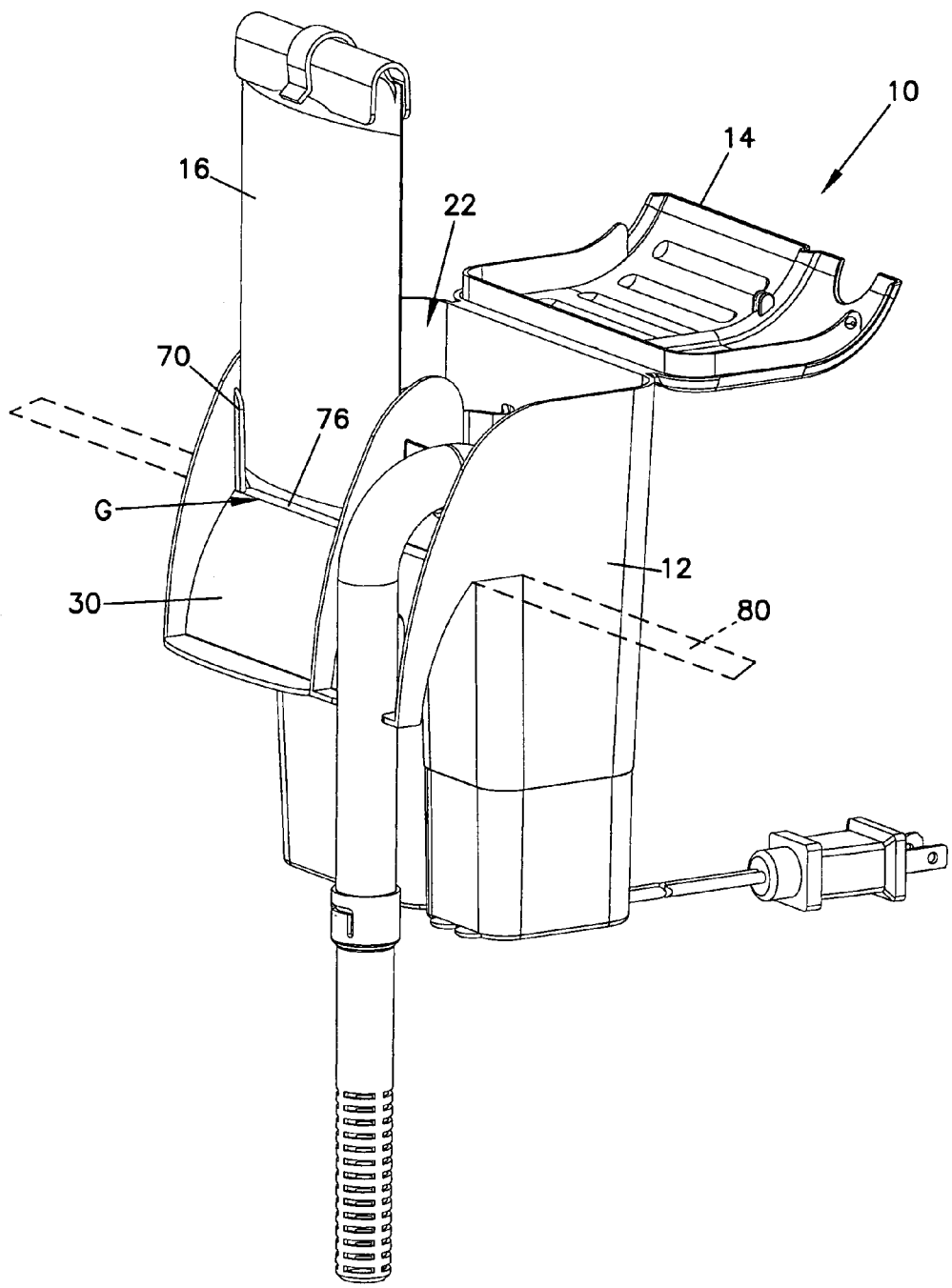
FIG. 6 is a perspective side view of the filter arrangement of FIG. 2, shown with the filter cartridge positioned in secondary guides.

Referring now to FIG. 6, in the illustrated embodiment, the secondary guides 70 secure the used filter cartridge 16 in a position where the water from the saturated filter cartridge 16 drains either into the filter chamber 22 or down the spillway 30 and into the aquarium 80. While the used filter cartridge is draining, the user can then install a new filter cartridge, for example, or perform other maintenance tasks.

Once the used filter cartridge has drained, the cartridge 16 is removed from the secondary guides 70 and disposed.

In another application, the secondary guides 70 can be used during treatment of fish or the aquarium water. For instance, some aquarium environment treatments, including the treatment of fish, bacteria, fungus and algae, for example, require removal of carbon-containing filter cartridges to be effective. Rather than removing the filter cartridge 16 and trying to find a place to store the filter cartridge during the treatment period, the filter cartridge 16 of the present filter arrangement 10 can be conveniently stored in the secondary guides 70.

To prevent the interaction of the treated water and carbon possibly contained within the filter cartridge 16, the filter cartridge is only partially inserted within the secondary guides 70 so that a gap G exists between the filter cartridge 16 and a top surface 76 of the spillway 30. By this, the user need not unplug the filter arrangement 10, which is otherwise required if the carbon-containing filter cartridge is not removed from the housing 12. Rather, the filter arrangement 10 can be used to pump or circulate water through the filter housing 12 to facilitate dispersion of the treatment throughout the aquarium. Because the filter cartridge 16 is only partially inserted, water passes through the gap G without contacting the filter cartridge. In other words, the filter cartridge 16 is isolated from the water circulation so that the treatment is effectively administered to the aquarium water.

Figure 7:
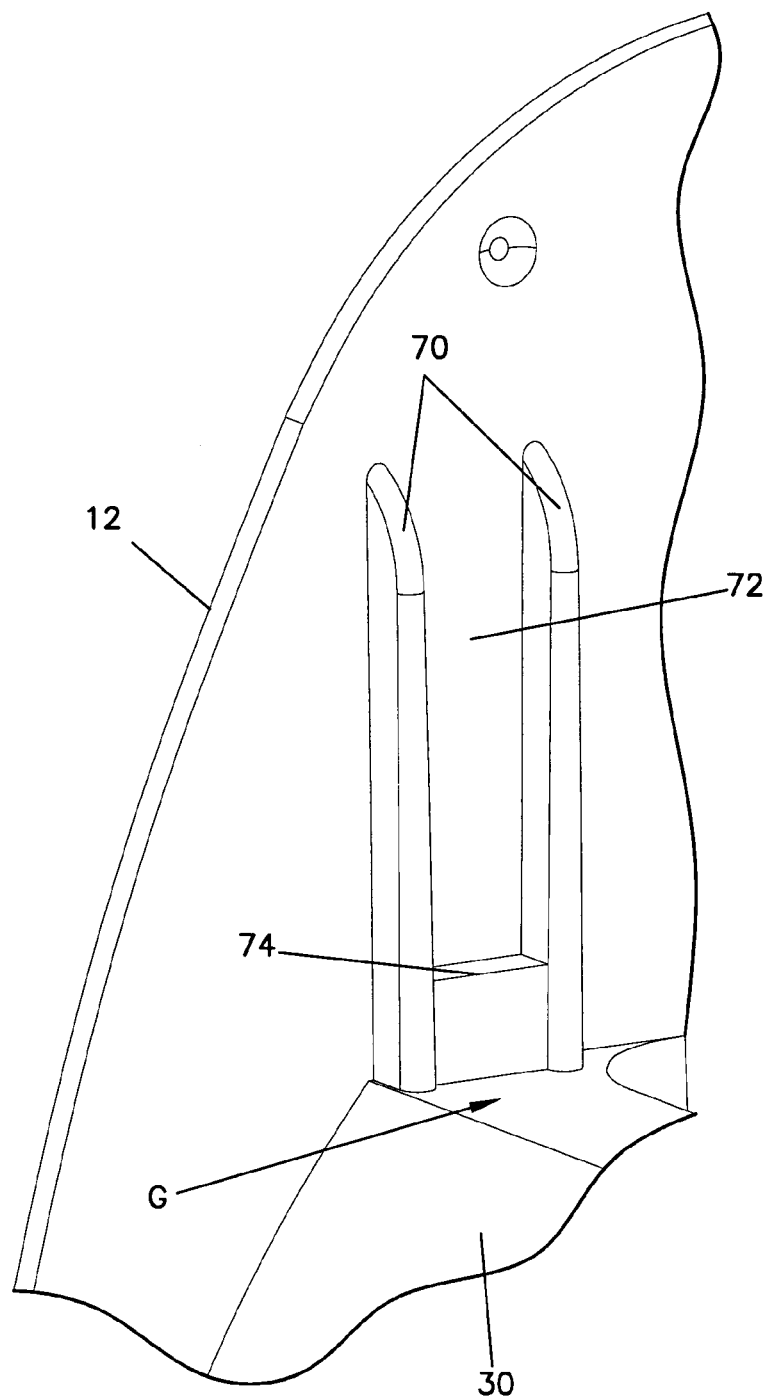
FIG. 7 is an enlarged, partial view of the filter arrangement of FIG. 2, showing a stop formed in the secondary guides.

The filter cartridge 16 and the second cartridge retaining structure 68 are correspondingly sized so that a friction fit holds or secures the filter cartridge 16 in the secondary guides 70 such that the gap G is provided between the filter cartridge and the spillway 30, for example. In an alternative embodiment, as shown in FIG. 7, stops 74 (only one shown) may be formed within the slots 72 of the secondary guides 70. The stops 74 limit the insertion of the filter cartridge 16 within the secondary guides 70 and define the gap G located between the filter cartridge 16 and the spillway 30.

The above specification provides a complete description of the present FILTER HOUSING ARRANGEMENT. Since many embodiments of the invention can be made without departing from the spirit and scope of the invention, certain aspects of the invention reside in the claims hereinafter appended.

What is claimed is:

1. An aquarium filter arrangement comprising:
   a) a filter housing having a filter chamber;
   b) a filter cartridge positionable within the filter housing;
   c) aquarium mounting structure configured to externally mount the filter housing to an aquarium; and
   d) a hinged cover connected to the filter housing, the hinged cover including a water retaining structure configured to retain condensation within the cover when the cover is selectively opened, the water retaining structure including a lip that fits within the interior of the filter housing when the cover is closed.

2. The arrangement of claim 1, wherein the lip of the water retaining structure extends along a majority of a perimeter of the cover.

3. The arrangement of claim 1, wherein at least one recess is formed in the cover to collect condensation when the cover is opened.

4. The arrangement of claim 1, wherein the cover includes a concave underside that defines a collection region configured to retain condensation when the cover is opened.

5. The arrangement of claim 1, wherein the water retaining structure is configured to empty condensation held within the cover, into the filter chamber of the filter housing, when the cover is selectively closed.

6. The arrangement of claim 1, wherein the cover includes a concave underside, the concave underside defining a plurality of recesses that collect condensation when the cover is opened.

7. A method of accessing a filter cartridge positioned in an aquarium filter, the method comprising the steps of:
   a) pivoting a hinged cover of the aquarium filter from a closed position to an open position;
   b) accessing the filter cartridge positioned in a filter chamber of the aquarium filter;
   c) positioning a lip formed on the cover within an interior of the filter chamber while pivoting the hinged cover from the open position to the closed position; and
   d) emptying condensation collected in the opened cover into the filter chamber.

8. The method of claim 7, further including collecting condensation formed on the cover within a collection region of the hinged cover when the cover is in the open position.

9. The method of claim 8, further including collecting condensation within recesses formed in the collection region of the hinged cover when the cover is in the open position.

10. A method of accessing a filter cartridge positioned in an aquarium filter, the method comprising the steps of:
    a) pivoting a hinged cover of the aquarium filter from a closed position to an open position;
    b) accessing the filter cartridge positioned in a filter chamber of the aquarium filter;
    c) collecting condensation within recesses formed in a collection region of the hinged cover when the cover is in the open position; and
    d) pivoting the hinged cover from the open position to the closed position while emptying condensation collected in the opened cover into the filter chamber.

* * * * *